United States Patent
Fiorani et al.

(10) Patent No.: US 11,606,833 B2
(45) Date of Patent: Mar. 14, 2023

(54) PACKET DATA CONVERGENCE PROTOCOL DATA RECOVERY

(71) Applicant: Telefonaktiebolaget LM Ericsson (publ), Stockholm (SE)

(72) Inventors: Matteo Fiorani, Solna (SE); Panagiotis Saltsidis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 126 days.

(21) Appl. No.: 17/257,148

(22) PCT Filed: Jun. 27, 2019

(86) PCT No.: PCT/SE2019/050632
§ 371 (c)(1),
(2) Date: Dec. 30, 2020

(87) PCT Pub. No.: WO2020/009643
PCT Pub. Date: Jan. 9, 2020

(65) Prior Publication Data
US 2021/0235534 A1  Jul. 29, 2021

Related U.S. Application Data

(60) Provisional application No. 62/693,003, filed on Jul. 2, 2018.

(51) Int. Cl.
H04W 76/19 (2018.01)
H04L 1/08 (2006.01)

(52) U.S. Cl.
CPC .............. *H04W 76/19* (2018.02); *H04L 1/08* (2013.01)

(58) Field of Classification Search
CPC .................................. H04W 76/19; H04L 1/08
See application file for complete search history.

(56) References Cited

U.S. PATENT DOCUMENTS

| 2007/0112995 A1* | 5/2007 | Manula | G06F 13/423 710/310 |
| 2019/0387561 A1* | 12/2019 | Paladugu | H04W 76/15 |
| 2020/0092939 A1* | 3/2020 | Kim | H04W 76/30 |

(Continued)

OTHER PUBLICATIONS

Unknown, Author, "Centralized retransmission for multiconnectivity case", 3GPP TSG-RAN WG3 Meeting #97bis, R3-173851, Prague, Czech, Oct. 9-13, 2017, 1-7.

(Continued)

*Primary Examiner* — Mewale A Ambaye
(74) *Attorney, Agent, or Firm* — Murphy, Bilak & Homiller, PLLC

(57) ABSTRACT

Embodiments described herein provide methods and apparatuses for synchronizing radio link control re-establishment between a user equipment (UE) and a base station distributed unit (DU) with Packet Data Convergence Protocol PDCP data recovery. A method performed by a Control Plane data processing apparatus comprises: obtaining an indication that an uplink and/or downlink outage has occurred between the base station DU and the UE; and transmitting a request to a user plane, UP, data processing apparatus to instruct the UP data processing apparatus to retransmit any data protocol units previously transmitted to the UE which were unacknowledged by the UE.

18 Claims, 14 Drawing Sheets

1502
Receive a request, from a control plane, CP, data processing apparatus, to retransmit any data protocol units previously transmitted to the UE which were unacknowledged by the UE 1504
Responsive to receiving the request, retransmit to the UE any data protocol units previously transmitted to the UE which were unacknowledged by the UE

(56) References Cited

U.S. PATENT DOCUMENTS

| | | | |
|---|---|---|---|
| 2020/0106663 A1* | 4/2020 | Yoo | H04L 67/10 |
| 2021/0211960 A1* | 7/2021 | Ryu | H04W 36/14 |
| 2021/0307100 A1* | 9/2021 | Talebi Fard | H04W 76/18 |
| 2022/0015063 A1* | 1/2022 | Byun | H04W 76/40 |

OTHER PUBLICATIONS

Unknown, Author, "Clarification on SN modification procedure", 3GPP TSG-RAN WG2 Meeting #101, R2-1802395, Athens, Greece, Feb. 26-Mar. 2, 2018, 1-11.

Unknown, Author, "Description of solutions for centralised retransmission with Option 2", 3GPP TSG-RAN WG3 Meeting #95bis, R3-171169, Spokane, USA, Apr. 3-7, 2017, 1-9.

Unknown, Author, "Discussion on additional cause values", 3GPP TSG-RAN WG3#99bis, R3-182051, Sanya, China, Apr. 16-20, 2018, 1-4.

Unknown, Author, "E1 cause values for TS38.463", 3GPP TSG RAN WG3 NR July Adhoc, R3-183720, Montreal, Canada, Jul. 2-6, 2018, 1-7.

Unknown, Author, "L2-based multi-hop architecture to support IAB architecture requirements", 3GPP TSG-RAN WG3 #99, R3-181345, Athens, Greece, Feb. 26-Mar. 2, 2018, 1-10.

Unknown, Author, "Lossless Data Transfer for IAB Design with Hop-by-Hop RLC ARQ", 3GPP TSG-RAN WG3 NR AdHoc 1807, R3-184185, Montreal, Canada, Jul. 2-6, 2018, 1-7.

3GPP, "3rd Generation Partnership Project; Technical Specification Group Radio Access Network; NG-RAN; Architecture description (Release 15)", 3GPP TS 38.401 V15.2.0, Jun. 2018, 1-39.

3GPP, "3rd Generation Partnership Project; Technical Specification Group Radio Access Network; NG-RAN; E1 Application Protocol (E1AP) (Release 15) 3GPP TS 38.463 V15.0.0", 3GPP TS 38.463 V15.0.0, Jun. 2018, 1-132.

3GPP, "3rd Generation Partnership Project; Technical Specification Group Radio Access Network; NR; Packet Data Convergence Protocol (PDCP) specification (Release 15)", 3GPP TS 38.323 V15 2.0, Jun. 2018, 1-26.

3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, 1-22.

3GPP, "3rd Generation Partnership Project; Technical Specification Group Services and System Aspects; System Architecture for the 5G System; Stage 2 (Release 15)", 3GPP TS 23.501 V15.2.0, Jun. 2018, 1-217.

Arnold, Paul, et al., "Deliverable D2.4 Final Overall 5G RAN Design", Mobile and wireless communications Enablers for the Twenty-twenty Information Society—II, Version 1.0, The 5G Infrastructure Public Private Partnership, Jun. 30, 2017, 1-114.

Bertenyi, Balazs, et al., "NG Radio Access Network (NG-RAN)", Journal of ICT, vol. 6_1&2, River Publishers, May 2018, 59-76.

Xu, Sen, et al., "Improved Fast Centralized Retransmission Scheme for High-Layer Functional Split in 5G Network", Journal of Physics: Conference Series, vol. 960, IOP Publishing, Jan. 2018, 1-11.

"Remaining Issues of Centralized Retransmissions", 3GPP TSG-RAN WG3 #98, R3-174409, Reno, NV, USA, Nov. 27-Dec. 1, 2017, pp. 1-5.

* cited by examiner

PACKET DATA CONVERGENCE PROTOCOL DATA RECOVERY

TECHNICAL FIELD

Embodiments described herein relate to methods and apparatus for synchronizing radio link control re-establishment between a user equipment, UE and a base station distributed unit, DU, with Packet Data Convergence Protocol, PDCP, data recovery.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates a current 5G Radio Access Network (NG-RAN) architecture.

The NG architecture may be further described as follows. The NG-RAN may comprise a set of gNBs, or base stations, connected to the 5G core network (5GC) through the new generation interface. A gNB may be able to support frequency division duplex (FDD) mode, time division duplex (TDD) mode and/or a dual mode operation. Base stations (gNBs) may be interconnected through an Xn interface. Each base station may comprise of a base station central unit (gNB-CU) and at least one base station distributed unit (gNB-DU).

The base station central unit and base station distributed unit(s) may be connected via an F1 logical interface. In some examples, each base station distributed unit, e.g. gNB-DU, is connected to only one base station central unit, e.g. gNB-CU.

NG, Xn and F1 comprise examples of logical interfaces. For NG-RAN, the NG and Xn-C interfaces for a base station (gNB) comprising of central unit (gNB-CU) and a distributed unit (gNB-DU), terminate in the central unit (gNB-CU). For Dual Connectivity to both Long Term Evolution (LTE) and 5G new Radio, the S1-U and X2-C interfaces for a base station (gNB) comprising of central unit (gNB-CU) and a distributed unit (gNB-DU), terminate in the gNB-CU. In some examples, the distinction between the central units and connected distributed units is not visible to other gNBs. These units are instead seen as a single entity, e.g. a gNB.

The NG-RAN may be layered into a Radio Network Layer (RNL) and a Transport Network Layer (TNL). The NG-RAN architecture, i.e. the NG-RAN logical nodes and interfaces between them, may be defined as part of the RNL. For each NG-RAN interface (NG, Xn, F1) the related TNL protocol and the functionality may be specified. The TNL provides services for user plane transport and signalling transport. In an NG-Flex configuration, each base station may be connected to all Access and Mobility function nodes (AMFs) within an AMF Region. The AMF Region may be defined as specified in 3GPP TS 23.501.

Some general principles for the specification of an F1 interface may be defined as follows:
- the F1 interface may be open;
- the F1 interface may support the exchange of signalling information between the endpoints of the interface. In addition the F1 interface may support data transmission to the respective endpoints;
- from a logical standpoint, the F1 interface may be considered as a point-to-point interface between the endpoints (a point-to-point logical interface may be feasible even in the absence of a physical direct connection between the endpoints);
- the F1 interface may support control plane and user plane separation;
- the F1 interface may separate Radio Network Layer and Transport Network Layer;
- the F1 interface may enable exchanges of user equipment (UE) associated information and non-UE associated information;
- the F1 interface may be defined to be future proof to fulfil different new requirements, and to support new services and new functions;
- one gNB-CU and set of gNB-DUs may be visible to other logical nodes in the network as a single node, e.g. a gNB. The gNB terminates the X2, Xn, NG and S1-U interfaces; and
- the central unit may be separated into a control plane (CP) central unit (CU-CP) and user plane (UP) central unit (CU-UP).

There may also be an open interface between the CU-CP and the CU-UP. This interface may be referred to as the E1 interface.

FIG. 2 illustrates an example of a split gNB architecture.

There may be at least three deployment scenarios for a split gNB architecture. In scenario 1 both the CU-CP and CU-UP of the gNB are centralized. In scenario 2 the CU-CP is distributed and the CU-UP is centralized. In scenario 3 the CU-CP is centralized and the CU-UP is distributed.

The E1 application protocol (E1AP) may define the messages that may be exchanged between the CU-CP and the CU-UP for the sake of providing user-plane services to the UE.

There currently exist certain challenge(s). Under a variety of conditions, the reestablishment of a radio link control (RLC) entity may be required. To prevent packet losses, the RLC re-establishment may be combined with a Packet Data Convergence Protocol (PDCP) data recovery.

In scenarios where the user plane and control plane of the central unit of the base station are split, the control plane may inform the user plane that the PDCP Data Recovery is needed. In this way the user plane may be instructed to re-transmit unacknowledged PDCP packet data units (PDUs) to the UE.

However, currently there is no mechanism with which to inform the user plane that PDCP Data Recovery is required.

Certain aspects of the present disclosure and their embodiments may provide solutions to these or other challenges. Embodiments described herein provide a mechanism for synchronizing an RLC-reestablishment (e.g., at a base station distributed unit (e.g. gNB-DU) with PDCP Data Recovery at a user plane data processing apparatus of the base station. The solution provides a mechanism to enable signaling on the E1 interface which requesting that the user plane data processing apparatus performs PDCP data recovery.

There are, proposed herein, various embodiments which address one or more of the issues disclosed herein.

Certain embodiments may provide one or more of the following technical advantage(s). The enablement of PDCP data recovery of affected dedicated radio bearers (DRBs) on the user plane of the central unit of the base station, by using specified PDCP methods.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To avoid the loss of any data packets when an outage occurs between a distributed unit of a base station and a user equipment, the radio link control (RLC) re-establishment may be synchronized with the PDCP data recovery. When receiving a request for PDCP data recovery, all the PDCP packet data units (PDUs) that have not been previously acknowledged by the UE, and would otherwise have been lost if not retransmitted, may be retransmitted.

In the architecture illustrated above in FIG. 2, as the control plane processing and user plane processing is spilt, if the base station's distributed unit (DU) detects an outage in the uplink and/or downlink transmissions between the DU and the UE, and decides to perform RLC-Reestablishment, it may inform the control plane processing apparatus (e.g the gNB-CU-CP) over the F1 interface. The base station's control plane processing apparatus may then inform the base station's user plan processing apparatus (e.g. the gNB-CU-UP) over the E1 interface. This notification may be performed for each affected dedicated radio bearer.

Figure 3:
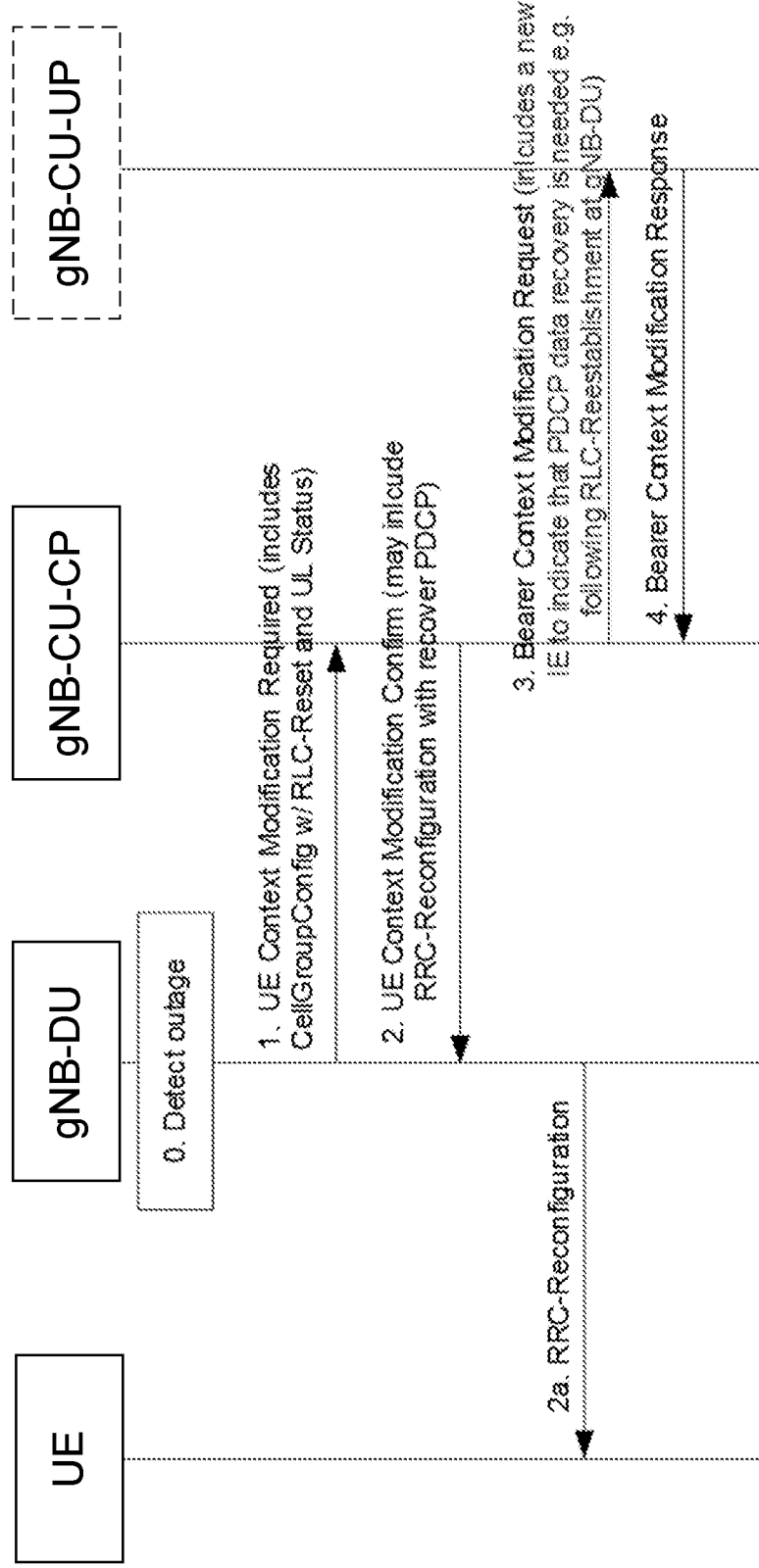
FIG. 3 illustrates an example of a procedure for PDCP Data Recovery with control plane processing and user plane processing being split between two apparatus.

It will be appreciated that the control plane processing apparatus may be centralized or distributed. It will also be appreciated that the user plane processing apparatus may be centralized or distributed. In some examples, where the control plane processing apparatus is distributed, it may be collocated with the gNB-DU. In some examples, where the user plane processing apparatus is distributed, it may be collocated with the gNB-DU FIG. 3 illustrates an example of a procedure for PDCP Data Recovery with control plane processing and user plane processing being split between two apparatus.

In step 0, the gNB-DU detects that a DL/UL outage has occurred and decides to reestablish RLC.

In step 1, the gNB-DU transmits an indication that the DL/UL outage has occurred to the control plane data processing apparatus (eNB-CU-CP). In this example, the indication comprises an UE Context Modification Required message to the comprising: (1) the information element indicating the cell group configuration (CellGroupConfig) with an reestablishRLC flag set true; and (2) an "RLC Status" information element to indicate to the control plane data processing apparatus, gNB-CU-CP, that RLC reestablishment has been performed.

In some examples, for example, in scenario 2 where the control plane is distributed and the user plane is centralized, the distributed unit of the base station may be collocated with the control plane data processing apparatus. In this example, the control plane data processing apparatus may obtains the indication that an UL and/or DL outage occurs when the distributed unit of the base station detects the outage.

In step 2, the control plane data processing apparatus may then decide to perform a PDCP Data Recovery in uplink (UL) and in downlink (DL). For UL, the control plane data processing apparatus may generate a Radio Resource Control (RRC) Reconfiguration message comprising the fields CellGroupConfig (generated by the gNB-DU) and recoverPDCP indication. The control plane data processing apparatus may then transmit the RRC-Reconfiguration message to the UE.

In step 3, the control plane data processing apparatus initiates PDCP Data Recovery in DL. For example, the control plane data processing apparatus may transmit a request to the user plane data processing apparatus to instruct the UP data processing apparatus to retransmit any data protocol units previously transmitted to the UE which were unacknowledged by the UE. For example, the request may comprise a Bearer Context Modification Request, configured to request the user plane to set up a bearer context, comprising a PDCP data recovery information element, IE, indicating that PDCP data recovery is requested. In other words, in some embodiments, a new "PDCP Data Recovery" information element may be included in the Bearer Context Modification Request message. When receiving this information element, the user plane data processing apparatus may be configured to retransmit all the unacknowledged PDCP packet data units to the UE in question.

In step 4, the user plane data processing apparatus replies with a Bearer Context Modification Response.

In some examples, to achieve this introduction of a new information element, the new information element PDCP Data Recovery Indication is introduced in the dedicated resource bearer (DRB) To Modify List IE in the BEARER CONTEXT MODIFICATION REQUEST message. When the user plane data processing apparatus receives such an information element indicating that PDCP data recovery is requested, the user plane data processing apparatus performs PDCP data recovery in DL for the associated DRB as specified by the PDCP specification.

In order to support such capability, the BEARER CONTEXT MODIFICATION REQUEST message may be modified as illustrated in table 1 below This message may be transmitted by the gNB-CU-CP to request the gNB-CU-UP to setup a bearer context.

TABLE 1

Illustrates an example of a Bearer Context Modification Request according to some examples.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Security Information | O | | 9.3.1.10 | | YES | reject |
| UE DL Aggregate Maximum Bit Rate | O | | Bit Rate 9.3.1.20 | | YES | reject |
| Bearer Context Status Change | O | | ENUMERATED (Suspend, Resume, ...) | Indicates to Suspend or Resume the Bearer Context | YES | reject |
| CHOICE System | M | | | | YES | reject |
| >E-UTRAN | | | | | | |
| >>DRB To Setup List | | 0.. 1 | | | YES | reject |
| >>>DRB To Setup Item | | 1..<maxnoof DRBs> | | | EACH | reject |
| >>>>DRB ID | M | | 9.3.1.16 | | — | — |
| >>>>PDCP Configuration | M | | 9.3.1.38 | | — | — |
| >>>>E-UTRAN QoS | M | | 9.3.1.17 | | — | — |
| >>>>S1 UL UP Trasnport Layer Information | M | | UP Transport Layer Information 9.3.2.1 | | — | — |
| >>>>Data Forwarding Information Request | O | | 9.3.2.5 | | — | — |
| >>>>Cell Group Information | M | | 9.3.1.11 | The gNB-CU-UP shall provide one UL UP Transport Layer Information Item per cell group entry | — | — |
| >>DRB To Modify List | | 0.. 1 | | | YES | reject |
| >>>DRB To Modify Item | | 1..<maxnoof DRBs> | | | EACH | reject |
| >>>>DRB ID | M | | 9.3.1.16 | | — | — |
| >>>>PDCP Data Recovery Indication | O | | ENUMERATED (enable, ...) | Indicates that PCDP Data Recovery is being requested. | YES | reject |
| >>>>PDCP Configuration | O | | 9.3.1.38 | | — | — |
| >>>>E-UTRAN QoS | O | | 9.3.1.17 | | — | — |
| >>>>S1 UL UP Parameters | O | | UP Transport Layer Information 9.3.2.1 | | — | — |

TABLE 1-continued

Illustrates an example of a Bearer Context Modification Request according to some examples.

| IE/Group Name | Presence | Range | IE type and reference | Semantics description | Criticality | Assigned Criticality |
|---|---|---|---|---|---|---|
| >>>>Data Forwarding Information Request | O | | 9.3.2.5 | | | — |
| >>>>PDCP Count Request | O | | ENUMERATED (requested, ...) | The gNB-CU-CP requests the gNB-CU-UP to provide the PDCP Count in the response message. | | — |
| >>>>PDCP UL Count | O | | PDCP Count 9.3.1.35 | PDCP count for first un-acknowledged UL packet. | | — |
| >>>>PDCP DL Count | O | | PDCP Count 9.3.1.35 | PDCPcount for next DL packet to be assigned. | | — |
| >>>>DL UP Parameters | O | | 9.3.1.13 | | | — |
| >>>>Cell Group To Add | O | | 9.3.1.11 | | | — |
| >>>>Cell Group To Modify | O | | 9.3.1.11 | | | — |
| >>>>Cell Group To Remove | O | | 9.3.1.11 | | | — |
| >>DRB To Remove List | | 0..1 | | | YES | reject |
| >>>DRB To Remove Item | | 1..<maxnoof DRBs> | | | EACH | reject |
| >>>>DRB ID | M | | | | | — |
| >NG-RAN | | | | | | |
| >>PDU Session Resource To Setup List | | 0..1 | | | YES | reject |
| >>>PDU Session Resource To Setup Item | | 1..<maxnoof PDUSession Resource> | | | EACH | reject |
| >>>>PDU Session ID | M | | 9.3.1.21 | | | — |
| >>>>PDU Session Type | M | | 9.3.1.22 | | | — |
| >>>>S-NSSAI | M | | 9.3.1.9 | | | — |
| >>>>Security Indication | M | | 9.3.1.23 | | | — |
| >>>>PDU Session Resource Aggregate Maximum Bit Rate | M | | 9.3.1.20 | | | — |
| >>>>NG UP UL Transport Layer Information | M | | UP Transport Layer Information 9.3.2.1 | | | — |
| >>>>PDU Session Data Forwarding Information Request | O | | Data Forwarding Information Request 9.3.2.5 | | | — |
| >>>>DRB To Setup List | | 1 | | | | |
| >>>>>DRB To Setup Item | | 1..<maxnoof DRBs> | | | | |
| >>>>>>DRB ID | M | | 9.3.1.16 | | | — |
| >>>>>>SDAP Configuration | M | | 9.3.1.39 | 9.3.1.xx24 | | — |
| >>>>>>PDCP Configuration | M | | 9.3.1.38 | | | — |

TABLE 1-continued

Illustrates an example of a Bearer Context Modification Request according to some examples.

| IE/Group Name | Presence | Range | IE type and reference | Semantics description | Criticality | Assigned Criticality |
|---|---|---|---|---|---|---|
| >>>>>>Cell Group Information | M | | 9.3.1.11 | The gNB-CU-UP shall provide one UL UP Transport Layer Information Item per cell group entry. | — | |
| >>>>>>Flow Mapping Information | M | | QoS Flow QoS Parameters List 9.3.1.25 | | — | |
| >>>>>>DRB Data forwarding information Request | O | | Data Forwarding Information Request 9.3.2.5 | | — | |
| >>PDU Session Resource To Modify List | | 0..1 | | | YES | reject |
| >>>PDU Session Resource To Modify Item | | 1..<maxnoof PDUSession Resource> | | | EACH | reject |
| >>>>PDU Session ID | M | | 9.3.1.21 | | — | |
| >>>>PDU Session Type | O | | 9.3.1.22 | | — | |
| >>>>S-NSSAI | O | | 9.3.1.9 | | — | |
| >>>>Security Indication | O | | 9.3.1.23 | | — | |
| >>>>PDU Session Resource Aggregate Maximum Bit Rate | O | | 9.3.1.20 | | — | |
| >>>>NG UP UL Transport Layer Information | O | | UP Transport Layer Information 9.3.2.1 | | — | |
| >>>>PDU Session Data Forwarding Information Request | O | | Data Forwarding Information Request 9.3.2.5 | | — | |
| >>>>DRB To Setup List | | 1..1 | | | | |
| >>>>>DRB To Setup Item | | 1..<maxnoof DRBs> | | | | |
| >>>>>>DRB ID | M | | 9.3.xx1 | | — | |
| >>>>>>SDAP Configuration | M | | 9.3.1.39 | | — | |
| >>>>>>PDCP Configuration | M | | 9.3.1.38 | | — | |
| >>>>>>Cell Group Information | M | | 9.3.1.11 | | — | |
| >>>>>>Flow Mapping Information | M | | QoS Flow QoS Parameters List 9.3.1.25 | | — | |
| >>>>>>DRB Data Forwarding Information Request | O | | Data Forwarding Information Request 9.3.2.5 | | — | |
| >>>>DRB To Modify List | | 0..1 | | | | |
| >>>>>DRB To Modify Item | | 1..<maxnoof DRBs> | | | EACH | reject |
| >>>>>>DRB ID | M | | | | — | |
| >>>>>PDCP Data Recovery Indication | O | | ENUMERATED (enable, ...) | Indicates that PCDP Data Recovery is being requested. | YES | reject |

TABLE 1-continued

Illustrates an example of a Bearer Context Modification Request according to some examples.

| IE/Group Name | Presence | Range | IE type and reference | Semantics description | Criticality | Assigned Criticality |
|---|---|---|---|---|---|---|
| >>>>>>SDAP Configuration | O | | 9.3.1.39 | | | — |
| >>>>>>PDCP Configuration | O | | 9.3.1.38 | | | — |
| >>>>>>DRB Data forwarding information Request | O | | Data Forwarding Information Request 9.3.2.5 | Overrides previous information. | | — |
| >>>>>>PDCP Count Request | O | | ENUMERATED (requested, ...) | The gNB-CU-CP requests the gNB-CU-UP to provide the PDCP Count in the response message. | | — |
| >>>>>>PDCP UL Count | O | | PDCP Count 9.3.1.35 | PDCP count for first un-acknowledged UL packet. | | — |
| >>>>>>PDCP DL Count | O | | PDCP Count 9.3.1.35 | PDCP count for next DL packet to be assigned. | | — |
| >>>>>>DL UP Parameters | O | | 9.3.1.13 | | | — |
| >>>>>>Cell Group To Add | O | | 9.3.1.11 | | | — |
| >>>>>>Cell Group To Modify | O | | 9.3.1.11 | | | — |
| >>>>>>Cell Group To Remove | O | | 9.3.1.11 | | | — |
| >>>>>>Flow Mapping Information | O | | QoS Flow QoS Parameters List 9.3.1.25 | Overrides previous mapping information. | | — |
| >>>>DRB To Remove List | | 0..1 | | | YES | reject |
| >>>>>DRB To Remove Item | | 1..<maxnoof DRBs> | | | EACH | reject |
| >>>>>>DRB ID | M | | | | | — |
| >>PDU Session Resource To Remove List | | 0..1 | | | YES | reject |
| >>>PDU Session Resource To Remove Item | | 1..<maxnoof PDUSession Resource> | | | EACH | reject |
| >>>>PDU Session ID | M | | | | | — |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

Figure 4:
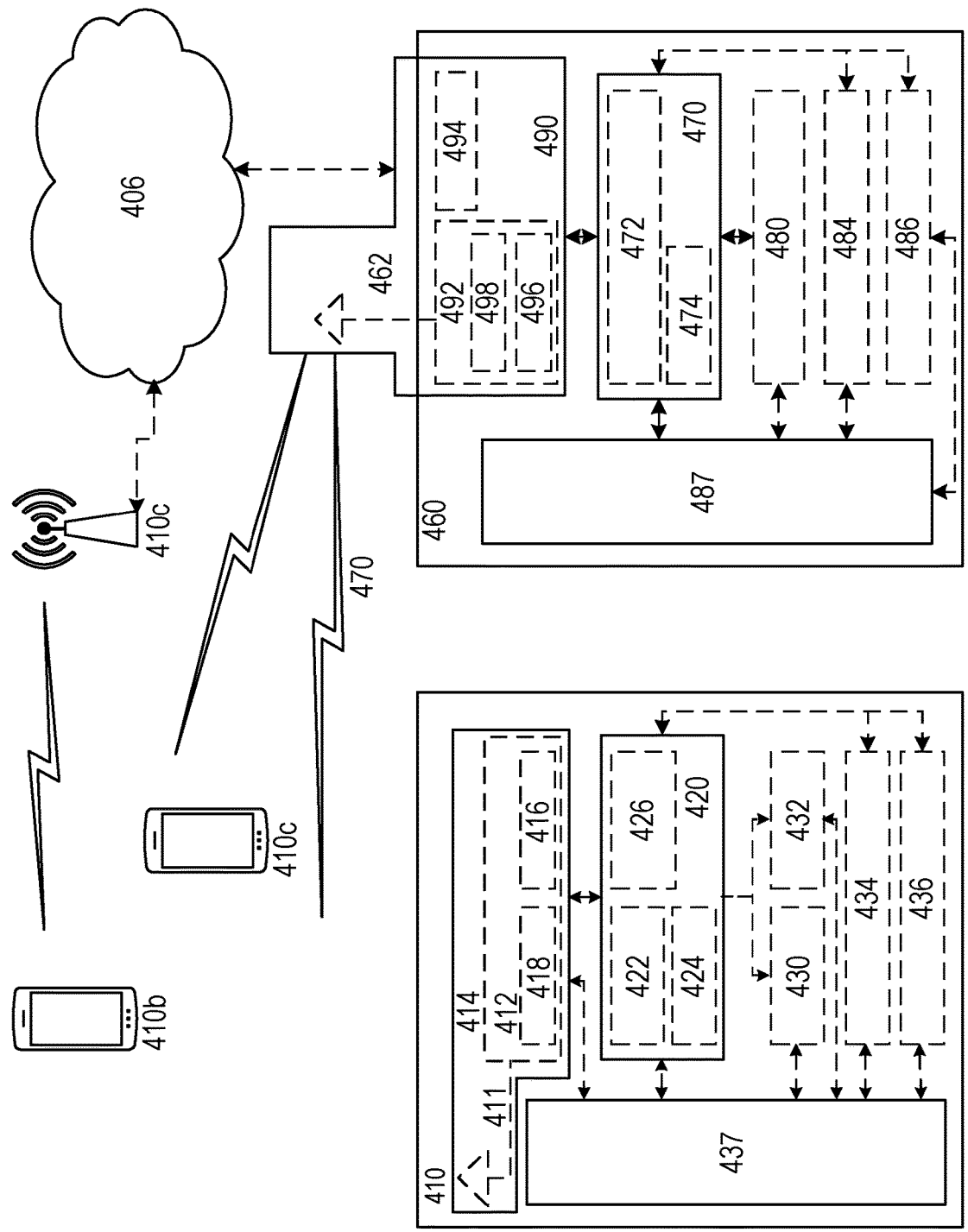
FIG. 4 illustrates a wireless network in accordance with some embodiments.

FIG. 4 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Figure 1:
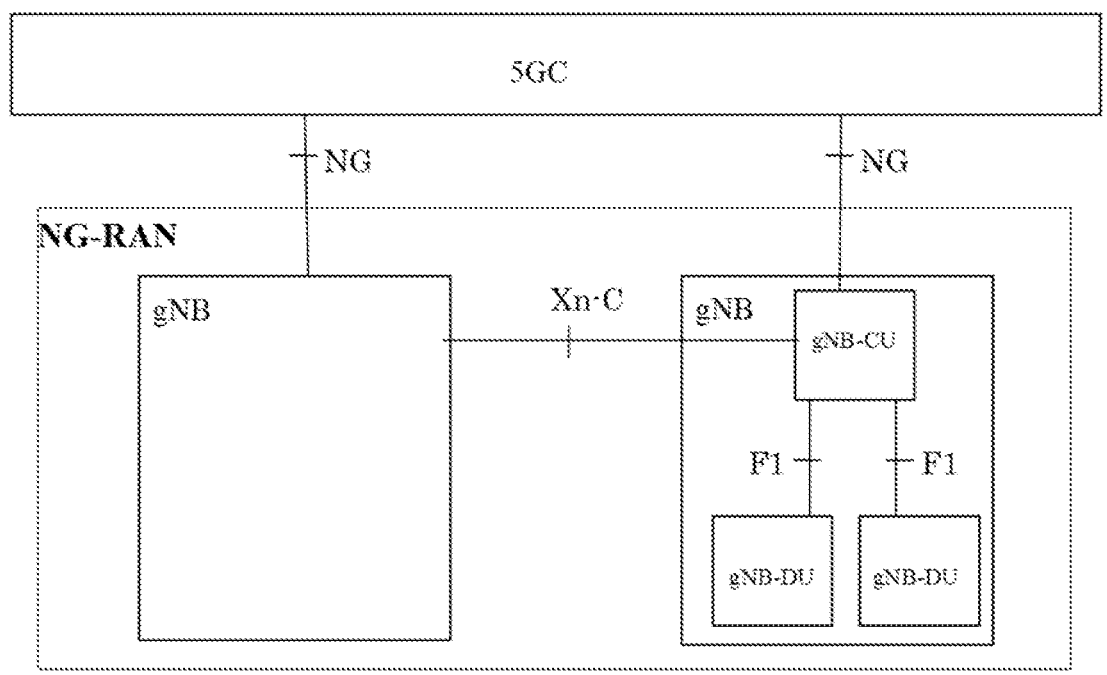
FIG. 1 illustrates a current 5G Radio Access Network (NG-RAN) architecture.
Figure 2:
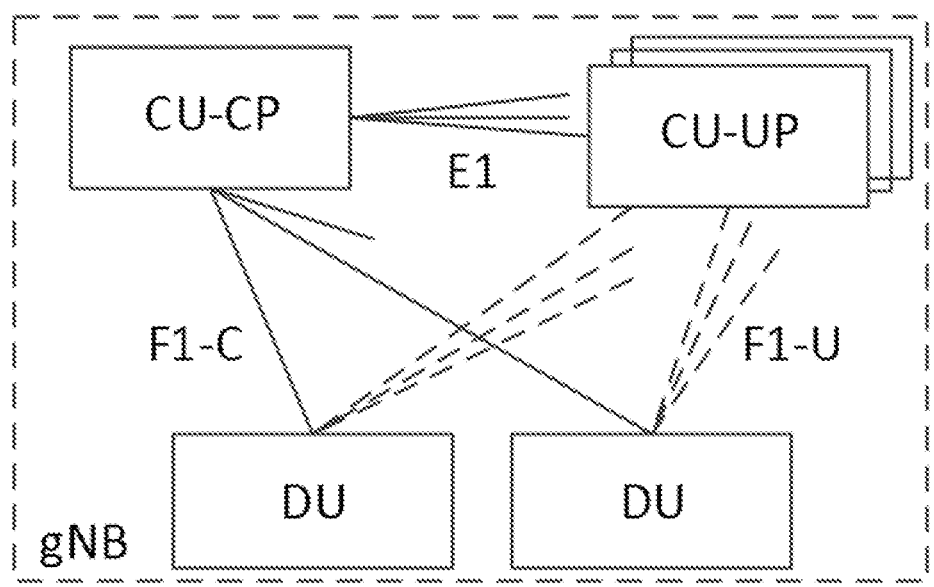
FIG. 2 illustrates an example of a split gNB architecture.

Similarly, network node 460 may be composed of multiple physically separate components (e.g., a NodeB component and a RNC component, or a BTS component and a BSC component, etc.), which may each have their own respective components. In particular, network node 460 may comprise a gNB which may be as illustrated in FIG. 2. In other words, may comprise a distributed unit and a central unit. In particular, the user plane processing and the control plane processing may be split. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470.

Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
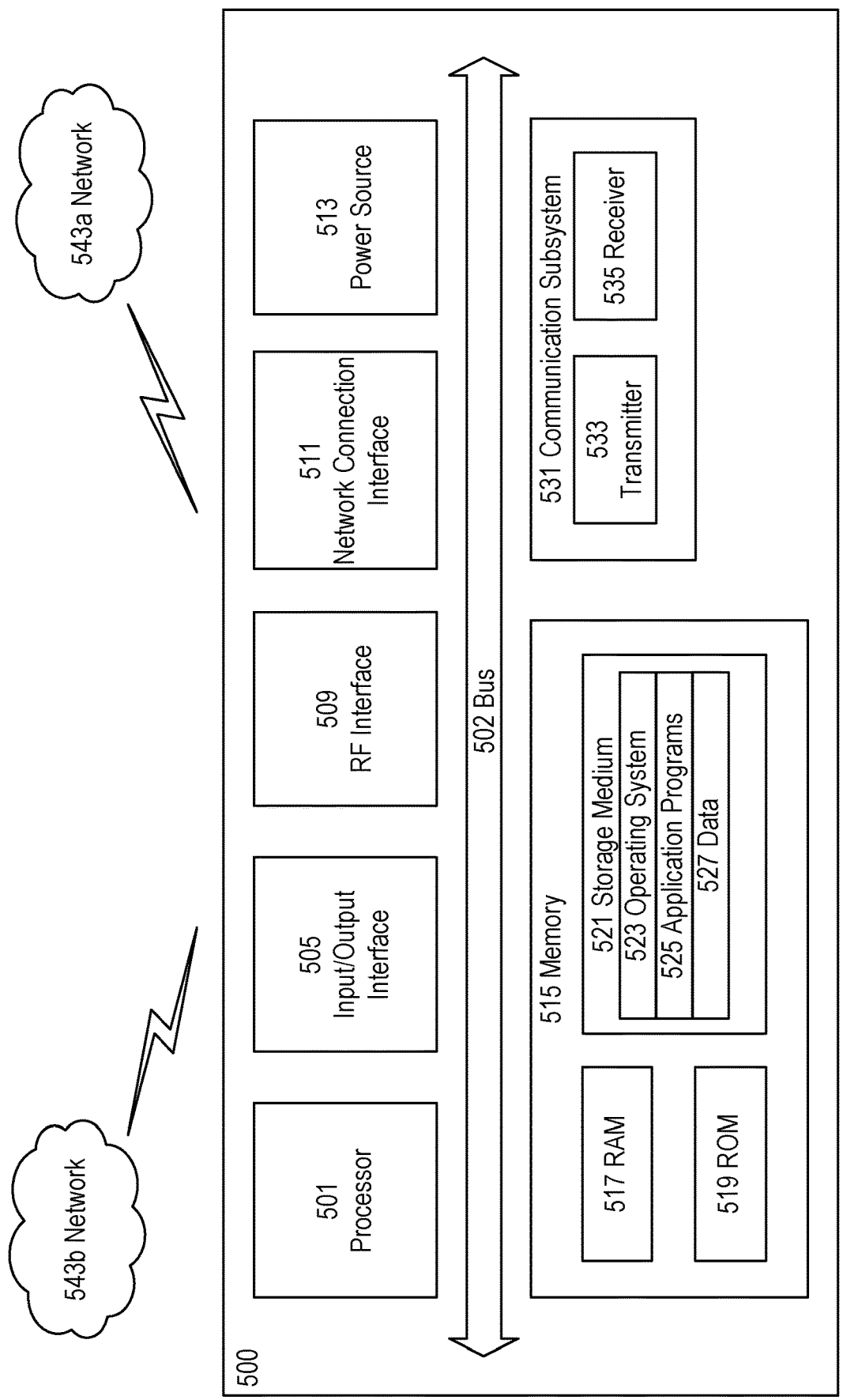
FIG. 5 illustrates a user Equipment in accordance with some embodiments.

FIG. 5 illustrates a user Equipment in accordance with some embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the $3^{rd}$ Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543*a*. Network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
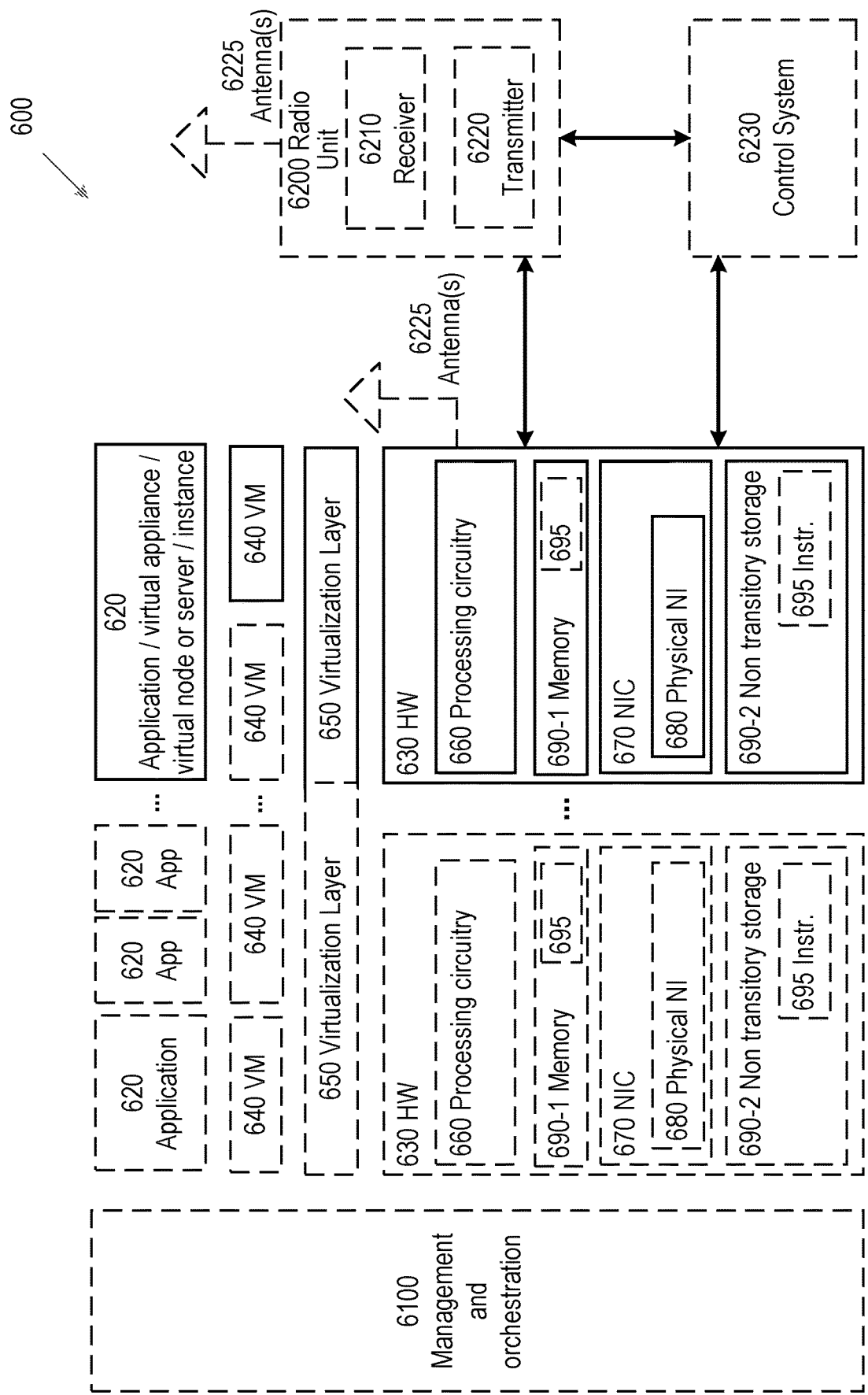
FIG. 6 illustrates a virtualization environment in accordance with some embodiments.

FIG. 6 illustrates a virtualization environment in accordance with some embodiments.

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
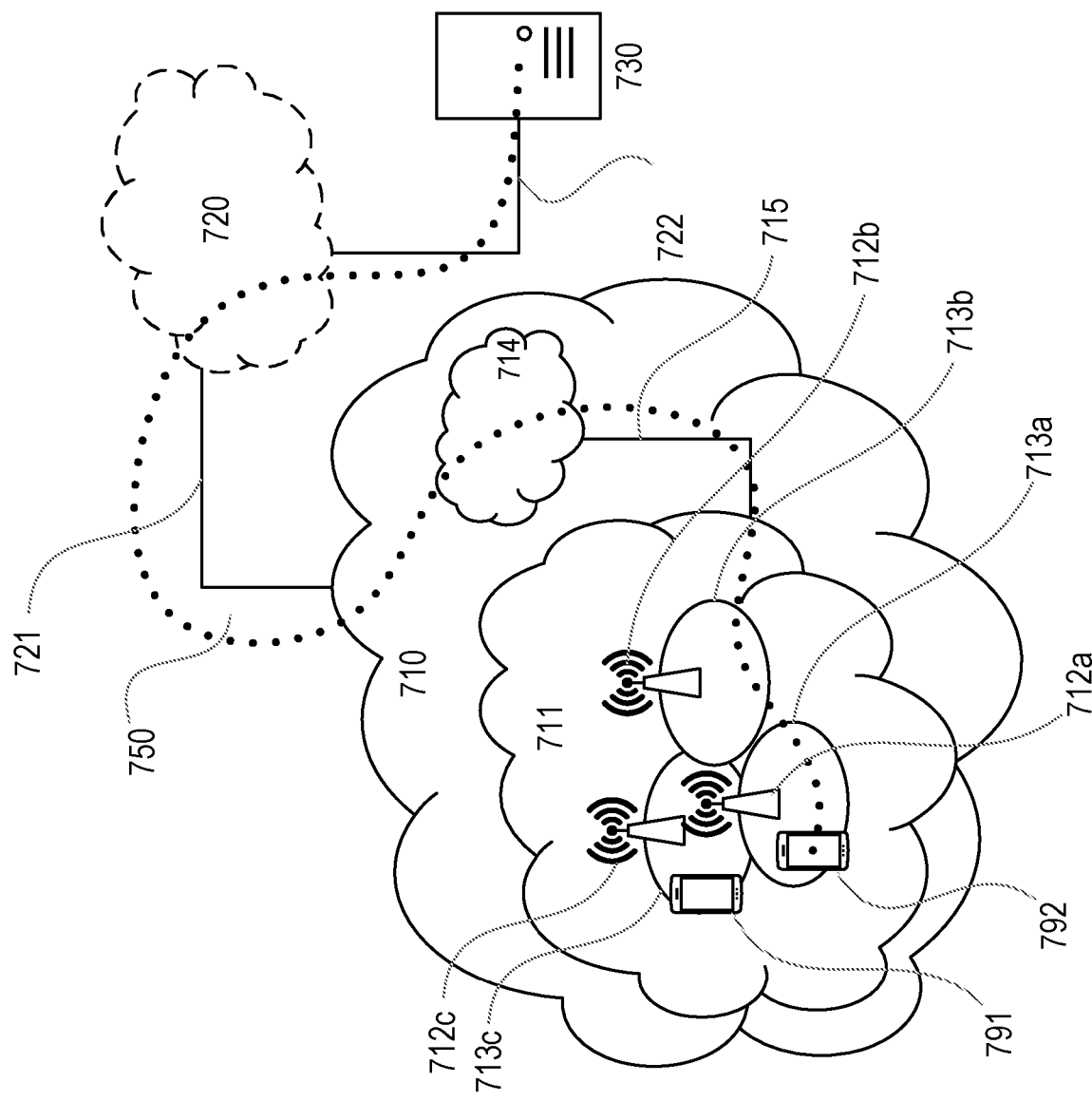
FIG. 7 illustrates a telecommunication network connected via an intermediate network to a host computer in accordance with some embodiments.

FIG. 7 illustrates a telecommunication network connected via an intermediate network to a host computer in accordance with some embodiments.

With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. It will be appreciated that base stations 712a 712b, and 712c may comprise gNBs as illustrated in FIG. 2. In other words each base station may comprise a user plane data processing apparatus and a control plane data processing apparatus. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
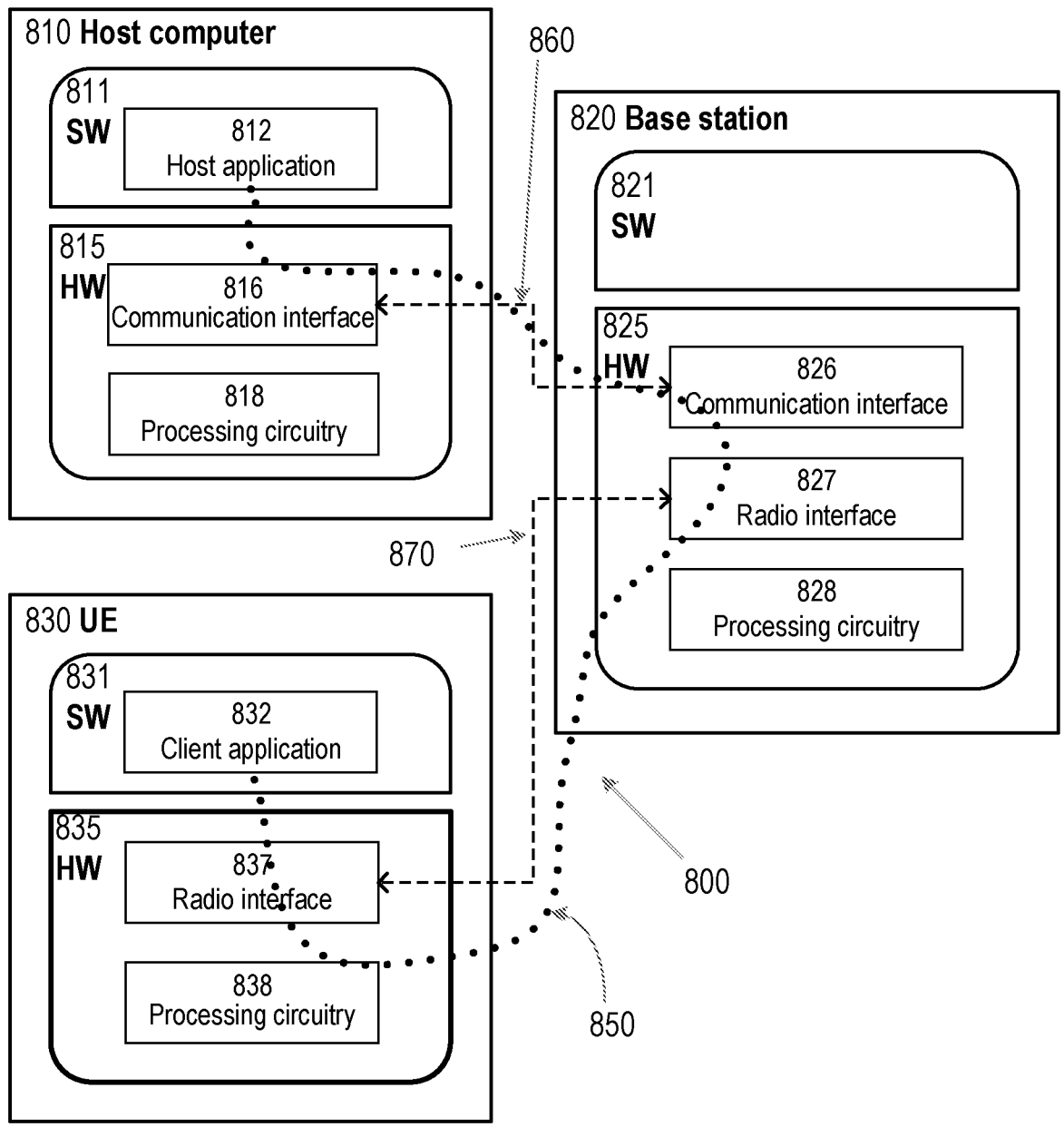
FIG. 8 illustrates a host computer communicating via a base station with a user equipment over a partially wireless connection in accordance with some embodiments.

FIG. 8 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
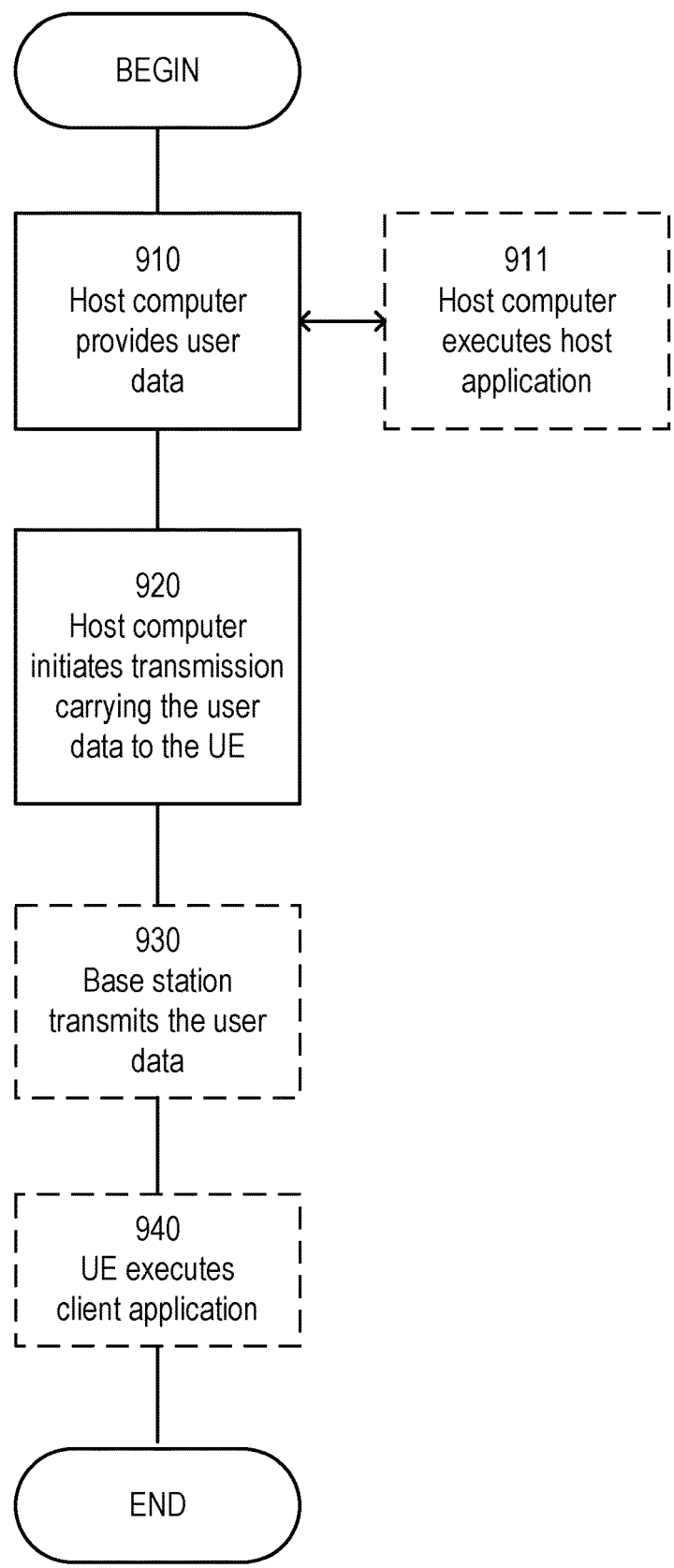
FIG. 9 illustrates methods implemented in a communication system including a host computer, a base station and a user equipment in accordance with some embodiments.

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
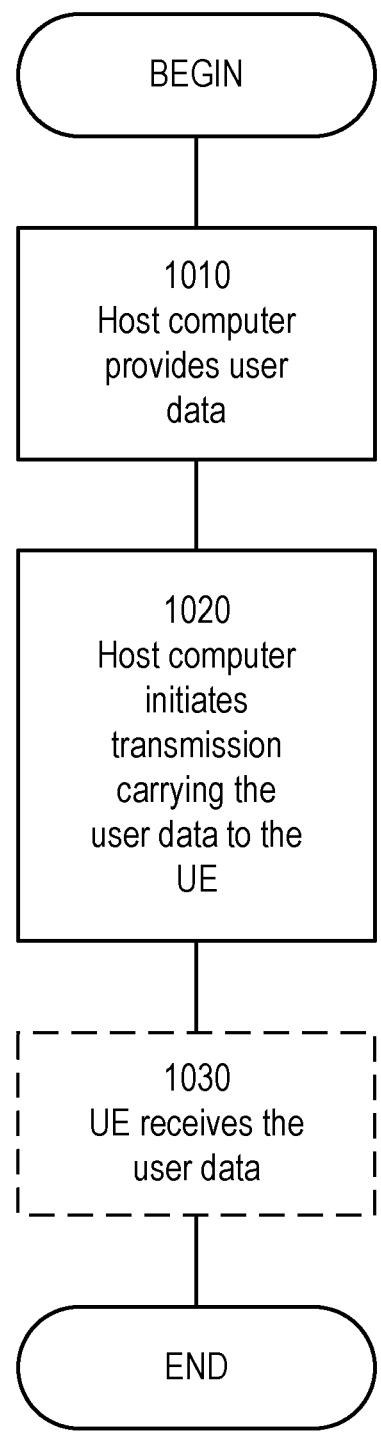
FIG. 10 illustrates methods implemented in a communication system including a host computer, a base station and a user equipment in accordance with some embodiments.

FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
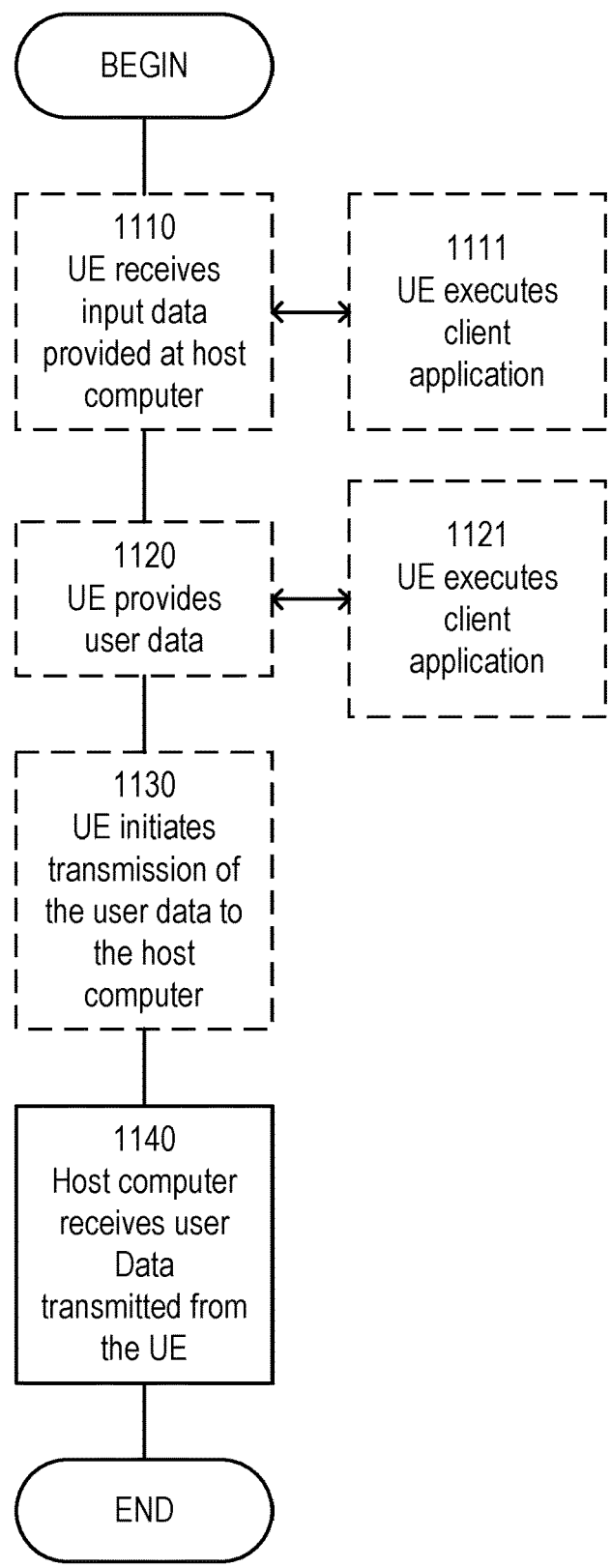
FIG. 11 illustrates methods implemented in a communication system including a host computer, a base station and a user equipment in accordance with some embodiments.

FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
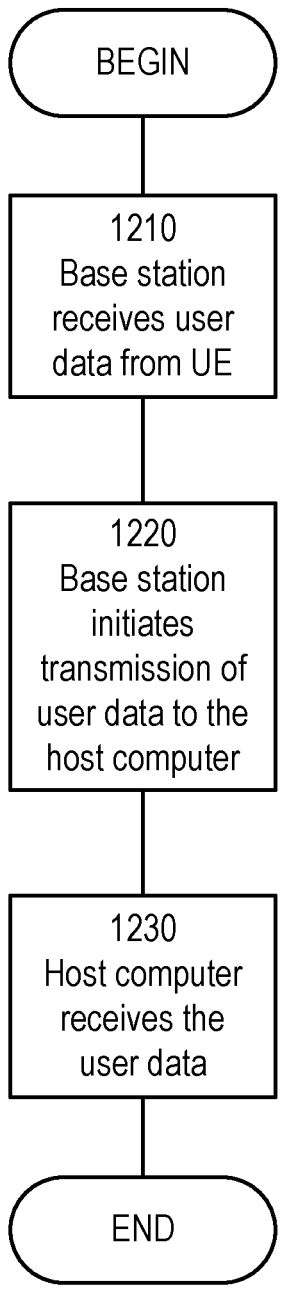
FIG. 12 illustrates methods implemented in a communication system including a host computer, a base station and a user equipment in accordance with some embodiments.

FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 13:
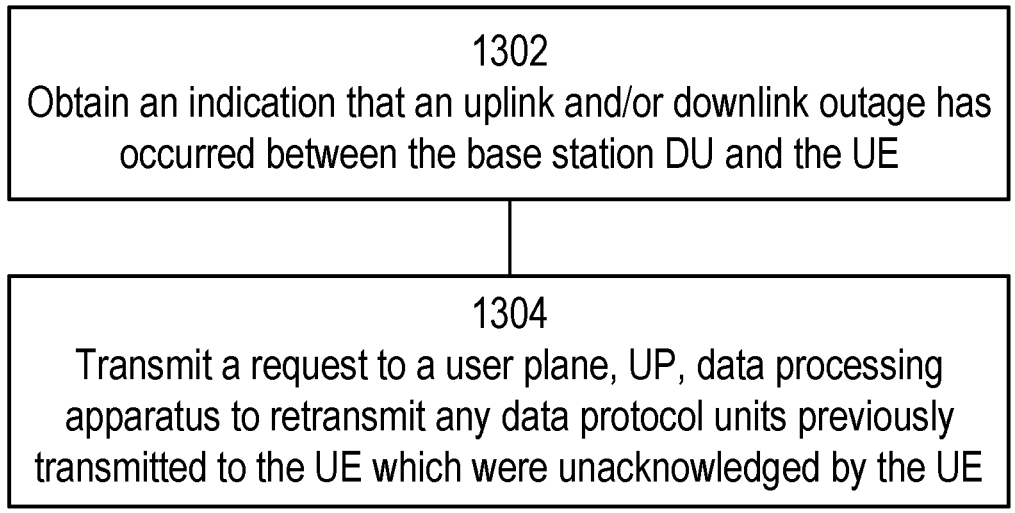
FIG. 13 illustrates a method in accordance with some embodiments.

FIG. 13 illustrates a method in accordance with some embodiments.

FIG. 13 depicts a method performed by a control plane, CP, data processing apparatus for synchronizing radio link control re-establishment between a user equipment, UE and a base station distributed unit, DU, with Packet Data Convergence Protocol, PDCP, data recovery in accordance with particular embodiments, the method begins at step 1302 in which the control plane data processing apparatus obtains an indication that an uplink and/or downlink outage has occurred between the base station DU and the UE. In step 1304 the control plane data processing apparatus transmit a request to a user plane, UP, data processing apparatus to instruct the UP data processing apparatus to retransmit any data protocol units previously transmitted to the UE which were unacknowledged by the UE.

Figure 14:
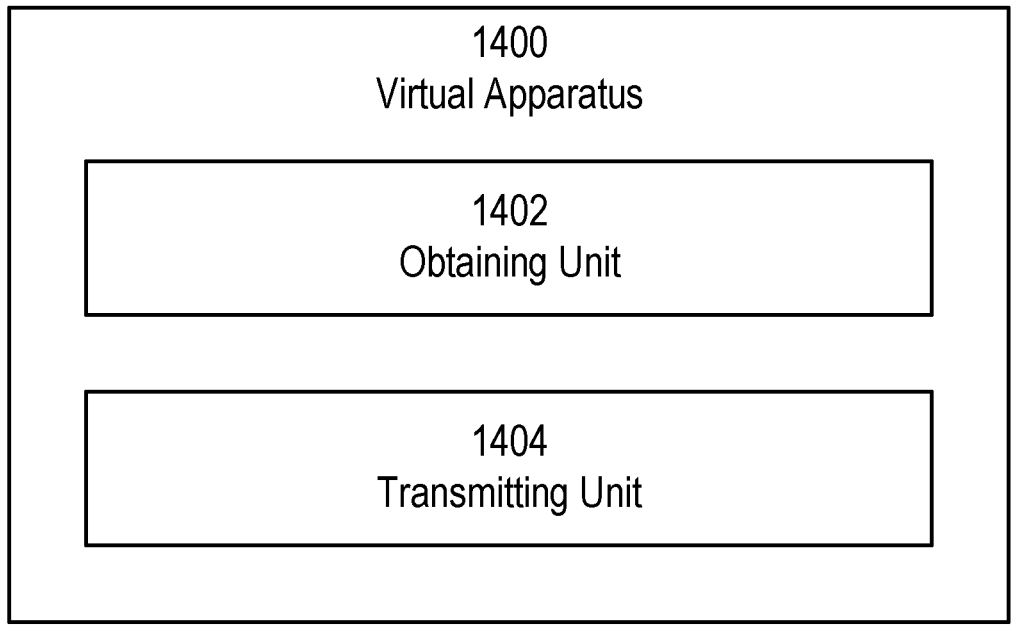
FIG. 14 illustrates a virtualization apparatus in accordance with some embodiments.

FIG. 14 illustrates a virtualization apparatus in accordance with some embodiments.

FIG. 14 illustrates a schematic block diagram of an apparatus 1400 in a wireless network (for example, the wireless network shown in FIG. 4). The apparatus may be implemented in a wireless device or network node (e.g., wireless device 410 or network node 460 shown in FIG. 4). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Obtaining unit 1402 and Transmitting unit 1404, and any other suitable units of apparatus 1400 to perform corresponding functions according one or more embodiments of the present disclosure.

As illustrated in FIG. 14 apparatus 1400 includes Obtaining unit 1402 and Transmitting unit 1404, Obtaining unit 1402 is configured to obtain an indication that an uplink and/or downlink outage has occurred between the base station DU and the UE. Transmitting Unit 1404 is configured to transmit a request to a user plane, UP, data processing apparatus to instruct the UP data processing apparatus to retransmit any data protocol units previously transmitted to the UE which were unacknowledged by the UE.

Figure 15:
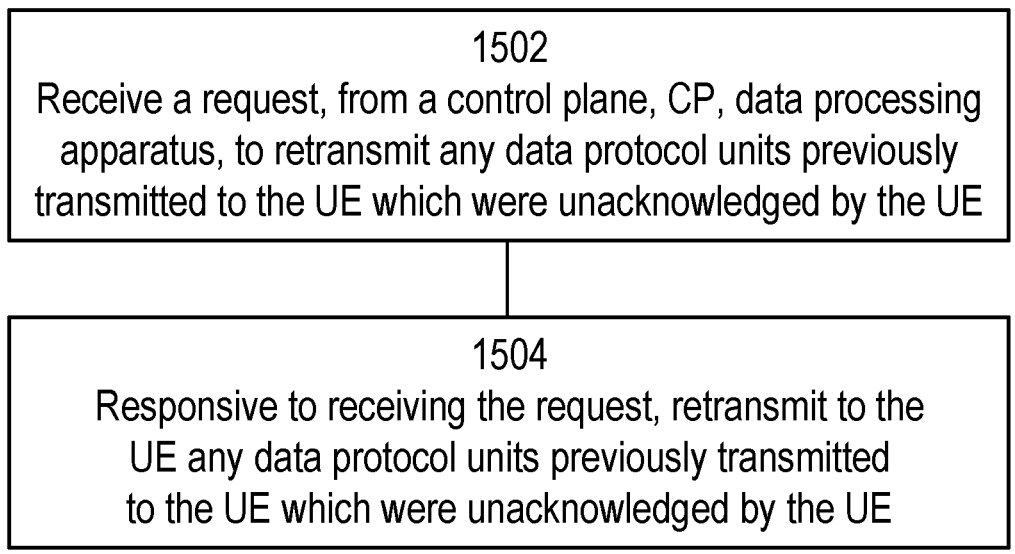
FIG. 15 illustrates a method in accordance with some embodiments.

FIG. 15 illustrates a method in accordance with some embodiments.

FIG. 15 depicts a method performed by a user plane, UP, data processing apparatus for synchronizing radio link control, RLC, re-establishment between a user equipment, UE and a base station distributed unit, DU, with Packet Data Convergence Protocol, PDCP, data recovery in accordance with particular embodiments, the method begins at step 1502 in which the user plane data processing apparatus receives a request, from a control plane, CP, data processing apparatus, to retransmit any data protocol units previously transmitted to the UE which were unacknowledged by the UE. In step 1504 the user plane data processing apparatus, responsive to receiving the request, retransmits to the UE any data protocol units previously transmitted to the UE which were unacknowledged by the UE.

Figure 16:
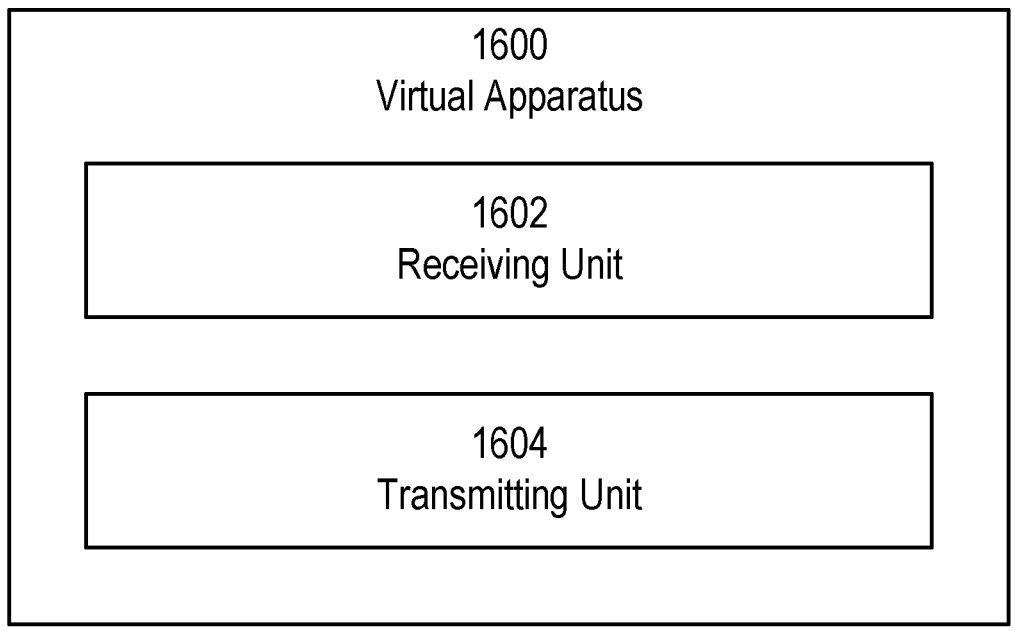
FIG. 16 illustrates a virtualization apparatus in accordance with some embodiments.

FIG. 16 illustrates a virtualization apparatus in accordance with some embodiments.

FIG. 16 illustrates a schematic block diagram of an apparatus 1600 in a wireless network (for example, the wireless network shown in FIG. 4). The apparatus may be implemented in a wireless device or network node (e.g., wireless device 410 or network node 460 shown in FIG. 4). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1602 and Transmitting unit 1604, and any other suitable units of apparatus 1600 to perform corresponding functions according one or more embodiments of the present disclosure.

As illustrated in FIG. 16 apparatus 1600 includes Receiving unit 1602 and Transmitting unit 1604, Receiving unit 1602 is configured to receive a request, from a control plane, CP, data processing apparatus, to retransmit any data protocol units previously transmitted to the UE which were unacknowledged by the UE. Transmitting Unit 1604 is configured to responsive to receiving the request, retransmit to the UE any data protocol units previously transmitted to the UE which were unacknowledged by the UE.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group A Embodiments
1. A method performed by a control plane, CP, data processing apparatus for synchronizing radio link control re-establishment between a user equipment, UE and a base station distributed unit, DU, with Packet Data Convergence Protocol, PDCP, data recovery, the method comprising:
   a. obtaining an indication that an uplink and/or downlink outage has occurred between the base station DU and the UE;
   b. transmitting a request to a user plane, UP, data processing apparatus to instruct the UP data processing apparatus to retransmit any data protocol units previously transmitted to the UE which were unacknowledged by the UE.
2. The method of embodiment 1 wherein the step of obtaining comprises:
   a. receiving the indication from the base station DU.
3. The method of embodiment 1 wherein the CP data processing apparatus is collocated with the base station DU.
4. The method of any previous embodiment wherein the indication comprises a UE Context Modification Required message.
5. The method of any previous embodiment further comprising, responsive to obtaining the indication, generating a radio resource control, RRC, reconfiguration message and transmitting the RRC reconfiguration message to the UE.
6. The method of any previous embodiment wherein the request comprises a Bearer Context Modification Request comprising a PDCP data recovery information element, IE, indicating that PDCP data recovery is requested.
7. The method of any of the previous embodiments, further comprising:
   providing user data; and
   forwarding the user data to a host computer via the transmission to the base station.
8. A method performed by a user plane, UP, data processing apparatus for synchronizing radio link control, RLC, re-establishment between a user equipment, UE and a base station distributed unit, DU, with Packet Data Convergence Protocol, PDCP, data recovery, the method comprising:
   a. receiving a request, from a control plane, CP, data processing apparatus, to retransmit any data protocol units previously transmitted to the UE which were unacknowledged by the UE; and
   b. responsive to receiving the request, retransmitting to the UE any data protocol units previously transmitted to the UE which were unacknowledged by the UE.
9. The method of embodiment 8 wherein the CP data processing apparatus is collocated with the base station DU.
10. The method of any one of embodiments 8 or 9 wherein the request comprises a Bearer Context Modification Request comprising a PDCP data recovery information element, IE indicating that PDCP data recovery is requested.
11. The method of any of the previous embodiments, further comprising:
    providing user data; and
    forwarding the user data to a host computer via the transmission to the base station.

Group C Embodiments
12. A base station for synchronizing radio link control re-establishment between a user equipment, UE and a base station distributed unit, DU, with Packet Data Convergence Protocol, PDCP, data recovery, the base station comprising:
    processing circuitry configured to perform any of the steps of any of the Group A embodiments;
    power supply circuitry configured to supply power to the base station.
13. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group A embodiments.

14. The communication system of the previous embodiment further including the base station.
15. The communication system of the previous 2 embodiments, further including the UE, wherein the UE is configured to communicate with the base station.
16. The communication system of the previous 3 embodiments, wherein:
   the processing circuitry of the host computer is configured to execute a host application, thereby providing the user data; and
   the UE comprises processing circuitry configured to execute a client application associated with the host application.
17. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group A embodiments.
18. The method of the previous embodiment, further comprising, at the base station, transmitting the user data.
19. The method of the previous 2 embodiments, wherein the user data is provided at the host computer by executing a host application, the method further comprising, at the UE, executing a client application associated with the host application.
20. A user equipment (UE) configured to communicate with a base station, the UE comprising a radio interface and processing circuitry configured to performs the of the previous 3 embodiments.
21. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments.
22. The communication system of the previous embodiment further including the base station.
23. The communication system of the previous 2 embodiments, further including the UE, wherein the UE is configured to communicate with the base station.
24. The communication system of the previous 3 embodiments, wherein:
   the processing circuitry of the host computer is configured to execute a host application;
   the UE is configured to execute a client application associated with the host application, thereby providing the user data to be received by the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
CU Central Unit
DU Decentralized Unit
NGC New Generation Core
NR New Generation Radio
PDCP Packet Data Convergence Protocol
UE User Equipment
UPF User Plane Function
AMF Access and Mobility Function
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a control plane (CP) data processing apparatus for synchronizing radio link control re-establishment between a user equipment (UE) and a base station distributed unit (DU) with Packet Data Convergence Protocol (PDCP) data recovery, the method comprising:
obtaining an indication that an uplink and/or downlink outage has occurred between the base station DU and the UE; and
transmitting a request to a user plane (UP) data processing apparatus to instruct the UP data processing apparatus to retransmit, via the base station DU, any data protocol units previously transmitted to the UE which were unacknowledged by the UE.

2. The method of claim 1, wherein the step of obtaining comprises receiving the indication from the base station DU.

3. The method of claim 1, wherein the CP data processing apparatus is collocated with the base station DU.

4. The method of claim 1, wherein the indication comprises a UE Context Modification Required message.

5. The method of claim 1, further comprising, responsive to obtaining the indication, generating a radio resource control (RRC) reconfiguration message and transmitting the RRC reconfiguration message to the UE.

6. The method of claim 1, wherein the request comprises a Bearer Context Modification Request comprising a PDCP data recovery information element (IE) indicating that PDCP data recovery is requested.

7. A method performed by a user plane (UP) data processing apparatus for synchronizing radio link control (RLC) re-establishment between a user equipment (UE) and a base station distributed unit (DU) with Packet Data Convergence Protocol (PDCP) data recovery, the method comprising:
receiving a request, from a control plane (CP) data processing apparatus, to retransmit any data protocol units previously transmitted by the base station DU to the UE which were unacknowledged by the UE; and
responsive to receiving the request, retransmitting to the UE, via the base station DU, any data protocol units previously transmitted to the UE which were unacknowledged by the UE.

8. The method of claim 7, wherein the CP data processing apparatus is collocated with the base station DU.

9. The method of claim 7, wherein the request comprises a Bearer Context Modification Request comprising a PDCP data recovery information element (IE) indicating that PDCP data recovery is requested.

10. A control plane (CP) data processing apparatus for synchronizing radio link control re-establishment between a user equipment (UE) and a base station distributed unit (DU) with Packet Data Convergence Protocol (PDCP) data recovery, the CP data processing apparatus comprising processing circuitry configured to:
obtain an indication that an uplink and/or downlink outage has occurred between the base station DU and the UE;
transmit a request to a user plane (UP) data processing apparatus to instruct the UP data processing apparatus to retransmit, via the base station DU, any data protocol units previously transmitted to the UE which were unacknowledged by the UE.

11. The CP data processing apparatus of claim 10, wherein the processing circuitry is configured to receive the indication from the base station DU.

12. The CP data processing apparatus of claim 10, wherein the CP data processing apparatus is collocated with the base station DU.

13. The CP data processing apparatus of claim 10, wherein the indication comprises a UE Context Modification Required message.

14. The CP data processing apparatus of claim 10, wherein the processing circuitry is further configured to, responsive to obtaining the indication, generate a radio resource control (RRC) reconfiguration message and transmit the RRC reconfiguration message to the UE.

15. The CP data processing apparatus of claim 10, wherein the request comprises a Bearer Context Modification Request comprising a PDCP data recovery information element (IE) indicating that PDCP data recovery is requested.

16. A user plane (UP) data processing apparatus for synchronizing radio link control (RLC) re-establishment between a user equipment (UE) and a base station distributed unit (DU) with Packet Data Convergence Protocol (PDCP) data recovery, the UP data processing apparatus comprising processing circuitry configured to:
   receive a request, from a control plane (CP) data processing apparatus, to retransmit any data protocol units previously transmitted to the UE which were unacknowledged by the UE; and
   responsive to receiving the request, retransmit to the UE, via the base station DU, any data protocol units previously transmitted to the UE which were unacknowledged by the UE.

17. The UP data processing apparatus of claim 16, wherein the CP data processing apparatus is collocated with the base station DU.

18. The UP data processing apparatus of claim 16, wherein the request comprises a Bearer Context Modification Request comprising a PDCP data recovery information element (IE) indicating that PDCP data recovery is requested.

* * * * *